F. H. HESSELBEIN.
SIGNALING DEVICE FOR MOTOR VEHICLES.
APPLICATION FILED MAR. 14, 1916.

1,257,863.

Patented Feb. 26, 1918.

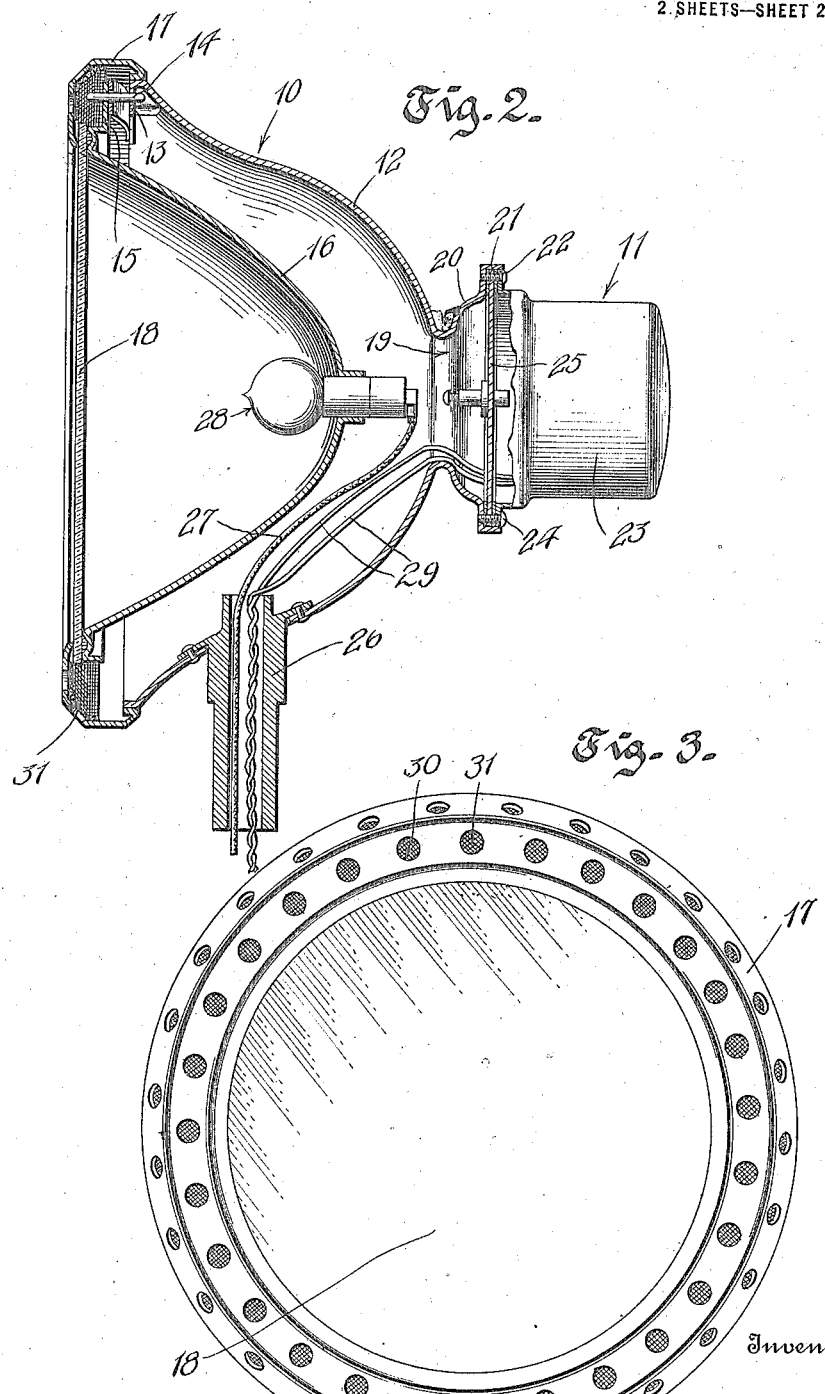

UNITED STATES PATENT OFFICE.

FRITZ H. HESSELBEIN, OF NEW YORK, N. Y.

SIGNALING DEVICE FOR MOTOR-VEHICLES.

1,257,863. Specification of Letters Patent. Patented Feb. 26, 1918.

Application filed March 14, 1916. Serial No. 84,123.

*To all whom it may concern:*

Be it known that I, FRITZ H. HESSELBEIN, a citizen of the United States, residing at New York city, in the county of New York and State of New York, have invented certain new and useful Improvements in Signaling Devices for Motor-Vehicles, of which the following is a specification.

My invention relates to new and useful improvements in signaling devices for motor vehicles in which I provide a combined headlight and audible signal, such as an electrically or mechanically operated horn, the primary object of my invention being the arrangement of a structure by means of which the ordinary casing of the headlight serves as a horn for properly throwing ahead the sound waves produced by mechanical means.

A still further object of my invention is to construct a combined headlight and horn in which the casing inclosing the sound producing mechanism of the horn is connected directly to and communicates with the casing of the lamp and in which, as a result, the horn mechanism and its wires are protected from injury and moisture.

With these and other objects in view, my invention will be more fully described, illustrated in the accompanying drawings, and then specifically pointed out in the claims which are attached to and form a part of this application.

In the drawings:

Fig. 2 is a central vertical sectional view taken longitudinally of the signaling device, the sound producing mechanism not being shown in detail as it constitutes no part of the present invention;

Fig. 3 is a front elevation of the structure shown in Fig. 2;

Corresponding and like parts are referred to in the following description and indicated in all the views of the drawings by the same reference characters.

Figure 1:
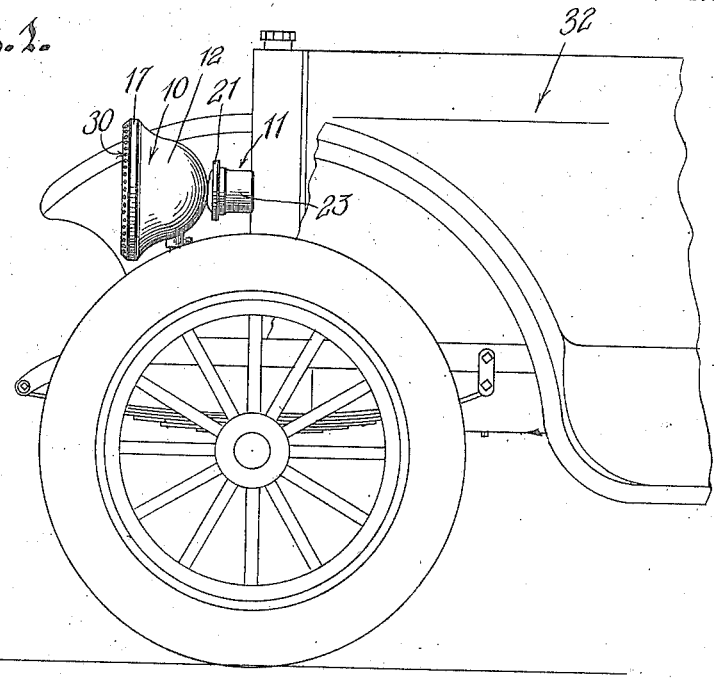
Figure 1 is a fragmentary elevational view, showing one of my combined signal devices mounted upon a conventional form of motor vehicle.

As best shown in Fig. 2 of the drawings, my improved signal device includes a headlight, best indicated as a whole by the numeral 10 and an audible signaling mechanism 11. The headlight 10 is there shown as of the electric type and is of standard construction, except for relatively slight changes in the body of the lamp and in the rim which holds the lens of the lamp in place. This headlight includes the usual semi-spherical or conical shell or body 12 pressed from sheet metal or other suitable material provided at its larger forward end with the inwardly directed flange 13 carrying the locking mechanisms 14 by means of which the peripheral flange 15 of the reflector 16 is secured in place as well as the rim 17 which secures the lens 18 in place. This body, however, at its back, instead of being closed, as is customary, is formed with an opening 19 surrounded by an outwardly flaring annular flange or sound bell 20 having a cylindrical edge portion 21 to seat the flange 22 of the casing 23 of the electrically operated horn mechanism 11, the flange 22 being secured to the flange 20 by clamping screws 24. This horn mechanism 11 is of conventional type including a diaphragm 25 which is vibrated by an electro-magnet mounted in the casing 23 and not shown in the drawings. It will be noted that the walls of the headlight casing around the opening 19 therein are bent inwardly to form a contracted neck arranged in front of and directly opposite the sound producing element in the auxiliary casing 11 so as to concentrate the sound from the signal and cause it to pass freely through the staggered openings in the angular rim of the lamp.

The locking mechanism 14 includes, as particularly shown in Fig. 2, suitable springs which are arranged to bear between the casing 12 and the flanges of the reflector and are compressed by the rim 17 to prevent the rattling or vibration thereof. Furthermore, it will also be observed upon reference to this figure of the drawings, that the rim is substantially channel-shaped in general contour and the outermost perforated wall thereof is inclined radially with respec' to the axis of the casing. The reflector projects beyond the outer end of the lamp casing to extend across the open side of the rim beneath the said inclined wall so that the outer margin of the reflector will tend to direct the sound waves emitted by the mechanism 11 toward the said wall of the rim to be diffused therethrough in all directions. The effectiveness of the device for giving an audible signal is thus materially increased accordingly.

It will be clear that the body of the lamp and the housing of the horn mechanism are in axial alinement with each other and, as a matter of fact, the body 12 of the lamp forms the sound directing horn for the sound producing mechanism inclosed in the housing 23. The body 12 of the lamp carries the usual tubular lamp supporting post 26 through which the current supply wires 27 of the socket of the light bulb 28 are led and the current supply wires 29 of the horn mechanism, which are suitably insulated, are led through openings formed in the diaphram 25 and also through the post 26 and from there to a push button disposed at any convenient point. Obviously, current may be supplied from any suitable source through the wires 27 to the horn or sound producing mechanism, a battery of dry cells or a storage battery being the most common sources of electrical energy employed for the horn.

In order that the sound produced by the horn may pass freely from my signal device, the rim 17, which holds the lens 18 of the lamp in place, is preferably provided with one or more series of peripherally spaced openings 30 and a screen ring 31 of fine netting or other foraminous material is preferably located within the rim 17 covering these openings in order to exclude dust, rain and snow. By this arrangement, I have provided a combined headlight and audible signal device which are in effect inclosed in a single common casing so that the parts are protected from dust and rain and which may be supported by a single supporting post mounted in a bracket secured to the vehicle. The signal device, as a whole, presents a neat and ornamental appearance and in effect improves the appearance of the vehicle by removing one of the various unsightly attachments heretofore found necessary. Obviously, I do not wish to limit myself to the use of a horn in connection with any particular type of headlight as it may be employed with electric lights. Furthermore, I do not wish to limit myself to the employment of an electrically operated horn as one of the elements of my signal device as a mechanically operated horn may be employed with equally good results under many circumstances.

Figure 4:
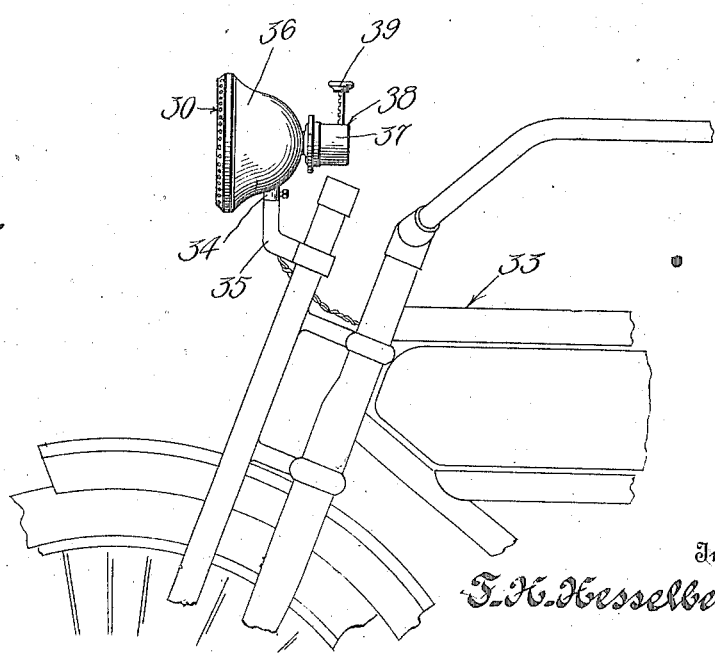
Fig. 4 is a fragmentary elevational view, showing a combined headlight and mechanical horn, such as may be employed upon bicycles, motorcycles and like vehicles.

In Fig. 1, I have illustrated my improved signal device of the electrically operated horn type as supported at the front of a conventional form of motor vehicle 32 and it will, of course, be clear that mechanically operated horn could not be employed in such a position. In Fig. 4, however, I have illustrated the use of a mechanically operated horn in connection with a headlight of a motorcycle 33. In this figure, the lamp post 34 is attached to the bracket 35 carried by the frame of the motorcycle and in turn carries a headlight 36, the body of which is connected to the casing 37 of a sound producing mechanism 38 operated by the reciprocating rack bar 39. Except for the difference in the sound producing mechanism itself, the structure shown in Fig. 4 is identical with that previously described.

It will of course be clear that headlights now in use and horns now in use may be remodeled and combined to produce my signaling device. That is, the horn portion proper of an electrical or mechanical horn may be cut-away a slight distance in advance of the diaphragm of the horn and the body of an electric light may have an opening formed in its rear portion corresponding in size to the internal diameter of the remaining portion of the horn body and the horn body and light body may be secured to each other by solder or rivets.

Because of the fact that various types of sound producing mechanisms may be interchangeably combined with various types of lamps, it will be understood that I do not wish to limit myself to the specific details of construction, illustrated and described but reserve the right to make any changes within the scope of the appended claims.

Having thus described the invention, what is claimed as new is:

1. In a signal device, a headlight including concentrically disposed spaced shells, one forming a lamp casing and the other a reflector, a rim connecting said shells and having angularly disposed faces provided with relatively large openings disposed in staggered relation to each other, the reflector extending beyond the outer end of the casing across the inner side of said rim, a strip of foraminous material arranged between the shells and bearing against the angular faces of the rim and covering the openings therein, the outer shell being formed at its rear end with an opening and with an annular portion surrounding the opening and flaring laterally to provide a seat in a plane substantially at right angles to the longitudinal axis of the lamp casing, said flaring portion of the shell terminating in an annular flange entirely surrounding the seat, an auxiliary casing engaging said seat and a sound producing element housed within the auxiliary casing, the diameter of the opening in the outer shell being less than the diameter of the auxiliary casing whereby to produce a contracted neck arranged in front of and directly opposite the sound producing element.

2. In a signal device, a headlight including a lamp casing, a reflector spaced concentrically therein, a perforated rim bridging the space between the outer end of the casing and the outer end of the reflector and connecting the reflector with the casing, yieldable means interposed between the outer ends of the casing and reflector and compressed by the rim for binding the rim in position, the casing at the rear end thereof being formed with an outwardly flared sound bell communicating at its smaller end with the casing, an auxiliary casing connected to the larger end of the said sound bell, and a sound producing element housed within the latter casing and operable for emitting a sound through the said sound bell and between the lamp casing and reflector to be liberated through the said rim, the said yieldable means acting to prevent vibration of the rim against the parts in contact therewith upon the sounding of the said element.

3. In a signal device, a headlight including a lamp casing, a reflector spaced concentrically therein and mounted to project beyond the outer end of the casing, a hollow channel-shaped rim bridging the space between the outer end of the reflector and the outer end of the rim and formed with a perforated wall inclined radially with respect to the axis of the casing, the casing at the inner end thereof being provided with an outwardly flared sound bell communicating at its smaller end with the casing, an auxiliary casing connected to the larger end of the sound bell, and a sound producing element housed within the latter casing and operable for emitting a sound through the said sound bell and between the lamp casing and reflector to be liberated through the said rim, the outer end of the reflector extending across the open side of the rim beneath the said inclined perforated wall thereof for directing the sound toward the said wall to be diffused outwardly in all directions therethrough.

In testimony whereof I affix my signature.

FRITZ H. HESSELBEIN. [L. S.]